(12) United States Patent
Yazawa

(10) Patent No.: US 9,403,333 B2
(45) Date of Patent: Aug. 2, 2016

(54) AUTOMATIC ZIPPER DEVICE FOR SHEET MEMBER AND METHOD FOR PRODUCING SHEET PRODUCT

(75) Inventor: Yusuke Yazawa, Tokyo (JP)

(73) Assignee: BRIDGESTONE CORPORATION, Tokyo (JP)

(\*) Notice: Subject to any disclaimer, the term of this patent is extended or adjusted under 35 U.S.C. 154(b) by 136 days.

(21) Appl. No.: 14/003,576

(22) PCT Filed: Mar. 15, 2012

(86) PCT No.: PCT/JP2012/056760
§ 371 (c)(1),
(2), (4) Date: Sep. 6, 2013

(87) PCT Pub. No.: WO2012/124779
PCT Pub. Date: Sep. 20, 2012

(65) Prior Publication Data
US 2013/0333824 A1  Dec. 19, 2013

(30) Foreign Application Priority Data
Mar. 15, 2011 (JP) ................................. 2011-057097

(51) Int. Cl.
*B29D 30/42* (2006.01)
*B29D 30/20* (2006.01)
(Continued)

(52) U.S. Cl.
CPC ............... *B29D 30/20* (2013.01); *B29C 65/56* (2013.01); *B29C 65/7802* (2013.01);
(Continued)

(58) Field of Classification Search
CPC ............... B29D 30/20; B29D 30/42; B29D 2030/2678; B29D 2030/422; B29D 2030/424; B29D 2030/425; B29D 2030/426; B29D 30/3007; B29D 2030/421; B29C 65/785; B29C 65/7802
USPC ............................... 156/134, 203, 304.1, 507
See application file for complete search history.

(56) References Cited

U.S. PATENT DOCUMENTS 4,765,862 A    8/1988  Azuma
4,793,890 A \*  12/1988 Sato ........................... 156/405.1
(Continued)

FOREIGN PATENT DOCUMENTS

EP         0460580 A2    12/1991
JP         A-62-187020    8/1987
(Continued)

OTHER PUBLICATIONS

Machine generated English language translation of JP 08-238686 (original document dated Sep. 1996).\*
(Continued)

*Primary Examiner* — Martin Rogers
(74) *Attorney, Agent, or Firm* — Oliff PLC

(57) ABSTRACT

An automatic zipper device having a pair of bevel gears for biting and joining joint end portions of a sheet member wound around a periphery of the molding drum and having a plurality of magnet attractive metallic cords, and the device is provided with an inclined portion following cylinder which is attached to a lateral movement device laterally moving on the molding drum so as to be laterally movable and which adjusts a height of the bevel gear in accordance with an inclined surface of the sheet member to be joined, a clamping cylinder for adjusting a bitten amount of the bevel gears, and introduction magnet rollers for taking in the sheet member, and a member contact position stabilizing magnet for maintaining a constant position of the sheet member so that the sheet member to be joined can be brought into contact with the bevel gear at a constant angle.

4 Claims, 3 Drawing Sheets

(51) Int. Cl.
    *B29C 65/78* (2006.01)
    *B29C 65/00* (2006.01)
    *B29C 65/56* (2006.01)
    *B29D 30/30* (2006.01)
    *B29L 30/00* (2006.01)
    *B29K 105/10* (2006.01)
    *B29K 105/24* (2006.01)

(52) U.S. Cl.
    CPC .......... *B29C 65/785* (2013.01); *B29C 65/7855* (2013.01); *B29C 66/1142* (2013.01); *B29C 66/4322* (2013.01); *B29C 66/49* (2013.01); *B29C 66/71* (2013.01); *B29C 66/7212* (2013.01); *B29C 66/72141* (2013.01); *B29C 66/816* (2013.01); *B29C 66/81419* (2013.01); *B29C 66/81433* (2013.01); *B29C 66/81465* (2013.01); *B29C 66/81469* (2013.01); *B29C 66/8221* (2013.01); *B29C 66/8242* (2013.01); *B29C 66/8362* (2013.01); *B29C 66/92613* (2013.01); *B29D 30/42* (2013.01); *B29C 66/221* (2013.01); *B29C 66/73752* (2013.01); *B29D 30/3007* (2013.01); *B29D 2030/422* (2013.01); *B29K 2105/101* (2013.01); *B29K 2105/246* (2013.01); *B29L 2030/003* (2013.01)

(56) References Cited

U.S. PATENT DOCUMENTS

| | | | | |
|---|---|---|---|---|
| 4,867,823 A | * | 9/1989 | Pizzorno | B29C 65/00 |
| | | | | 156/157 |
| 5,228,941 A | * | 7/1993 | Panicali | 156/421 |
| 5,389,187 A | * | 2/1995 | Marks et al. | 156/405.1 |
| 6,155,768 A | * | 12/2000 | Bacchi | H01L 21/67742 |
| | | | | 414/416.03 |
| 2008/0112786 A1 | * | 5/2008 | Deist | B60P 3/42 |
| | | | | 414/498 |
| 2010/0212836 A1 | * | 8/2010 | Tachibana et al. | 156/414 |

FOREIGN PATENT DOCUMENTS

| | | | | |
|---|---|---|---|---|
| JP | 64-31628 | * | 2/1989 | ............ B29D 30/30 |
| JP | 02-253932 | * | 10/1990 | ............ B29D 30/30 |
| JP | 07-276530 | * | 10/1995 | ............ B29D 30/30 |
| JP | 08-238686 | * | 9/1996 | ............ B29D 30/30 |
| JP | A-10-128868 | | 5/1998 | |
| JP | A-2002-166479 | | 6/2002 | |
| JP | A-2005-153349 | | 6/2005 | |
| JP | A-2007-62041 | | 3/2007 | |
| KR | 2005-0109135 | * | 11/2006 | ............ B29D 30/08 |

OTHER PUBLICATIONS

Machine generated English language translation of KR 2005-0109135 (original document dated Nov. 2006).*

Machine generated English language translation of JP 07-276530 (original document dated Oct. 1995).*

English language Abstract for JP 64-31628 (original document dated Feb. 1989).*

Oct. 17, 2014 European Search Report issued in European Application No. 12757822.7.

International Search Report issued in International Patent Application No. PCT/JP2012/056760 dated Jun. 12, 2012.

* cited by examiner

AUTOMATIC ZIPPER DEVICE FOR SHEET MEMBER AND METHOD FOR PRODUCING SHEET PRODUCT

TECHNICAL FIELD

The present invention relates to an automatic zipper device (joining device) for a sheet member, to an automatic zipper device for a sheet member such as a super-large tire ply and the like, for example, and a method for producing a sheet product.

BACKGROUND ART

When an unvulcanized tire is to be molded by sticking a sheet member of unvulcanized rubber to a molding drum, the sheet member of the unvulcanized rubber is cut to a length for one tire, the cut sheet member is stuck to the molding drum, and then, the both end portions are joined or a plurality of sheet members are overlapped and joined on the respective side portions.

The joining is performed in general by pressing a roller against a joint end portion, by stretching joint surfaces to the end portions on the other side and by joining the both ends so that they overlap with each other (See PTLs 1 to 3). Furthermore, in addition to the above, PTL 1 also describes a device which presses swing claws forming a pair against a rubber sheet and contracts a relative distance of the outer edges, to thereby join the rubber sheet.

However, in the case where, for example, a sheet member of unvulcanized rubber handled by a large-sized (for OOR) single molding machine for molding a super-large tire is to be joined, the above-mentioned prior-art technology cannot be used for the following reasons, and a hand-zipper device of a member-clamping type using a bevel gear has been used so far:

That is, (1) In the case of performing automatic joining, if a sheet member (ply) on the traveling direction side begins to open even slightly, the joining cannot be corrected in the middle and joining means such as, for example, a joining roll might idle and cannot join the sheet member well in some cases.

(2) In order to uniformly join the joint end portions, since the joining roll needs to be placed on the sheet member at a constant angle all the time, an inclined portion cannot be joined well in the case of the particularly large inclination of the sheet member.

(3) Since the vicinity of the end of the sheet member cannot be brought into close contact with a member on the lower side thereof for a folded ply wave measure, a joining device for pressing from above cannot be used.

In other words, in order to join the end portions of a ply having reinforcing cords embedded therein which is a sheet member of a super-large tire, a hand-zipper device operated manually has been used so far, and air is put into a bevel gear inside the hand-zipper device, that is, a rotation of the bevel gear is performed by an air motor, to thereby manually place the bevel gear on a ply joint end portion and to join the plies (sheet members).

However, the ply for the super-large tire is thick and also has a thick treat, and handling of the tire is hard work, and moreover, the prior-art hand-zipper device has a total weight of approximately 13 kg, which is too heavy to be held and operated by human, and when a worker performs joining ply having the reinforcing cords by the hand-zipper device, a quality of joined portion is varied, which is a problem.

Furthermore, when a clamping zipper is to be used, since the plies cannot be butted to each other as it is, a protrusion is made on the sheet member to be joined, but if the protrusion is made, a length of the ply exceeds the bonded periphery, and a work of manually holding down the extra portion is occurred after joining.

Therefore, automatic joining of the ply for the purpose of enhancement of productivity and alleviation of work load is required, but it is not easy to automate the work which has relied on human skills, and the hand-zipper devices have not been automated so far.

CITATION LIST

Patent Literature

PTL 1: Japanese Patent Laid-Open No. 2007-62041
PTL 2: Japanese Patent Laid-Open No. 2005-153349
PTL 3: Japanese Patent Laid-Open No. 2002-166479

SUMMARY OF INVENTION

Technical Problem

An object of the present invention is to automate a prior-art hand-zipper device which, on a molding drum, joins end portions of a sheet member (ply) having a plurality of aligned metallic cords, and to allow automatic joining of the sheet member, in molding of a tire, for example super-large tire or the like.

Solution to Problem

The present invention is an automatic zipper device for a sheet member for joining both joint end portions of the sheet member wound around a molding drum periphery while moving the joint end portions, characterized by having taking-in means for taking in a pair of sheet members into the device and a pair of biting means which is rotated and driven, for biting between teeth meshing with each other and joining the joint end portions of the sheet member taken into the device.

Moreover, the present invention is a method for producing a sheet product by joining both joint end portions of a sheet member wound around a molding drum periphery and having magnet attractive metallic cords embedded therein while moving the joint end portions, to thereby form the sheet product, characterized by including the steps of: attracting the joint end portions of the sheet member and taking in the joint end portions into the device, by a pair of upper and lower taking-in means with magnet; and after taking-in, clamping the sheet member by clamping means for maintaining a joint position of the sheet member and biting and joining the same by biting means as maintaining the joint position of the sheet member.

Advantageous Effects of Invention

According to the present invention, end portions of a sheet member having a thickness such as a ply for producing a super-large tire can be automatically joined without requiring a manual labor just as before. Therefore, productivity of a joining work of the sheet member can be enhanced, and a work burden of a worker can be alleviated.

DESCRIPTION OF EMBODIMENTS

An automatic zipper device for a sheet member according to an embodiment of the present invention will be described by referring to the attached drawings.

Figure 1:
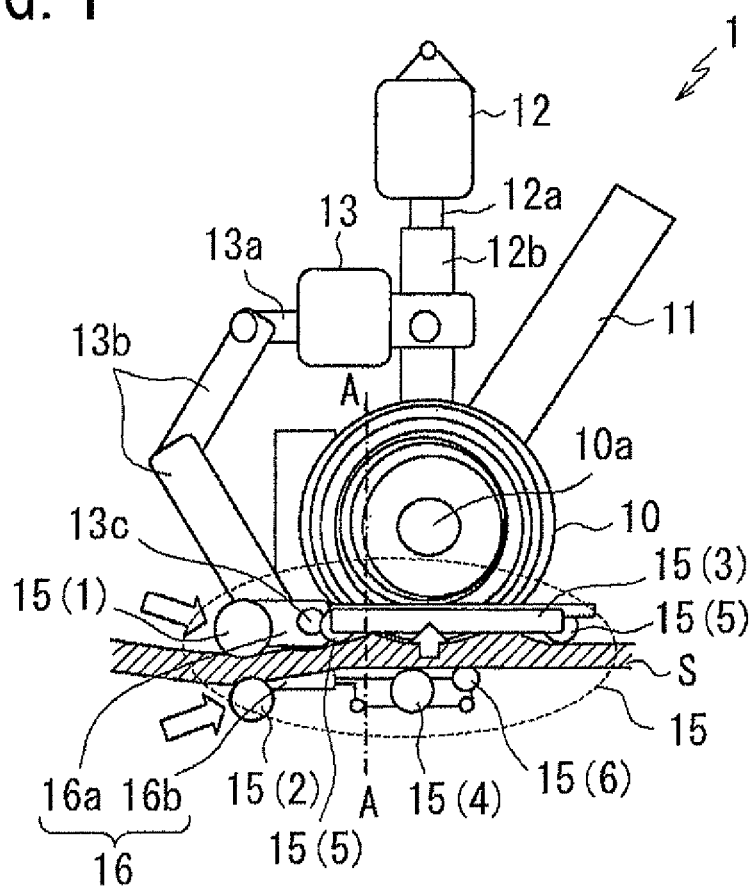
FIG. 1 is a front view schematically illustrating an automatic zipper device for a sheet member according to the present embodiment.

FIG. 1 is a front view schematically illustrating the automatic zipper device for a sheet member according to the present embodiment.

This automatic zipper device 1 is provided with a pair of bevel gears 10 which is biting means arranged facing each other for joining the sheet member, an air motor 11 for rotating and driving the bevel gears 10 around their center shafts 10a, an inclined portion following cylinder 12 for adjusting heights of the bevel gears 10 by causing them to follow the inclination of the sheet member to be joined, and a clamping cylinder 13. In addition, in order to assist joining of the sheet member by pressing the sheet member against the pair of bevel gears 10, a pair of pressing rollers 15(4) rotatably mounted on a support frame body 16 which will be described later is arranged facing each other on the lower side of the bevel gears 10. The pressing rollers 15(4) may be bevel gears meshing with each other and each having a small diameter.

Figure 2:
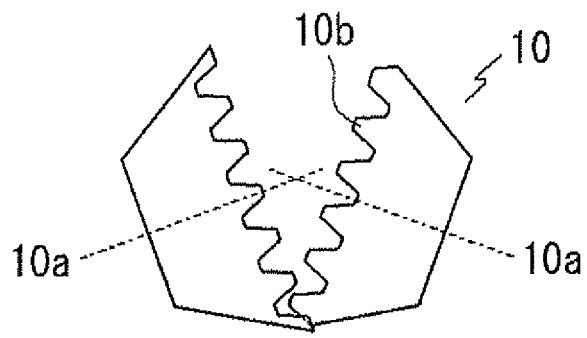
FIG. 2 is a diagram illustrating a meshing state of a bevel gear.

FIG. 2 is a diagram illustrating a meshing state of the bevel gear.

Each of the bevel gears 10 is arranged so that extensions of their center shafts 10a cross each other so that the lower part sides are mutually meshed with teeth 10b formed on an outer peripheral surface thereof as illustrated in FIG. 2 as with prior-art ones. The pair of sheet members S relatively moving with respect to the bevel gears 10 is bitten by the bevel gears 10 and joined each other.

The inclined portion following cylinder 12 is an air cylinder, and a leading end of its piston rod 12a is connected to the center shaft 10a of the bevel gear 10 (or may be a casing supporting the center shaft 10a, not shown) through a sleeve 12b.

To the sleeve 12b, one end portion of the clamping cylinder 13 is integrally connected in a direction orthogonal to the sleeve 12b, that is, in the horizontal direction. A leading end of a piston rod 13a of the clamping cylinder 13 is rotatably connected to an upper end portion of a dogleg-shaped arm 13b in front view as illustrated. A lower end of this dogleg-shaped arm 13b is pivotally connected to a shaft 13c of the support frame body 16 supporting the pressing rollers 15(4) and 15(6). When the piston rod 13a of the clamping cylinder 13 is extended, the pressing rollers 15(4) and 15(6) are lifted by the dogleg-shaped arm 13b together with the support frame body 16 while the shaft 13c is guided by a groove in an immovable frame body (not shown). As a result, the sheet member S is pressed by the pressing roller 15(4) against the pair of bevel gears 10 and is also pressed by the pressing roller 15(6) against a member contact position stabilizing magnet 15(3) (that is, clamping), and thus the sheet member S is held so as not to move arbitrarily.

Here, the clamping cylinder 13, the piston rod 13a, the arm 13b, the support frame body 16, the pressing rollers 15(4) and 15(6), and the member contact position stabilizing magnet 15(3) constitute clamping means for the sheet member. Furthermore, the clamping cylinder 13, the piston rod 13a, the arm 13b, the support frame body 16, and the pressing rollers 15(4) and 15(6) constitute pressing means provided in the clamping means. Meanwhile, the clamping means is not limited to the above described specific configuration, but may be anything as long as the means can clamp the sheet member passing through the bevel gears 10 between them and the member contact position stabilizing magnet 15(3) and press the sheet member against the pair of bevel gears 10 and also maintain a constant joint position thereof with respect to the bevel gears 10.

A guide portion 15 of the sheet member is made up of upper and lower parts of the support frame body 16, and on the upper part side, there are provided an induction magnet roller 15(1) which is arranged forward of the bevel gears 10 of an upper support frame body 16a seen from the left side in the figure, and which is taking-in means for taking in and guiding the sheet member S by causing magnetic force to act on the reinforcing cords made of magnet attractive metal and front and rear guide rollers 15(5) guiding the taken-in sheet member S.

In addition, on the lower part side, there are provided an induction magnet roller 15(2) which is arranged forward of the bevel gears 10 of a lower support frame body 16b and which is taking-in means for taking in and guiding the sheet member S by forming a pair with the induction magnet roller 15(1), the pressing roller 15(4), and the pressing roller 15(6) (meanwhile, the induction magnet rollers 15(1) and 15(2) do not necessarily have to be induction magnets but may be permanent magnets). Furthermore, each of the rollers on the upper and lower parts is rotatably supported by appropriate support means (or support frame), not shown.

The member contact position stabilizing magnet 15(3) is mounted, between the front and rear guide rollers 15(5) on each side of the bevel gears 10, on an immovable frame body (not shown) different from the support frame body 16 together with the bevel gears 10 in a traveling direction of the taken-in sheet member S. The member contact position stabilizing magnet 15(3) attracts the sheet member S and maintains it at a constant height. Furthermore, by operating the clamping cylinder 13, the sheet member S is pressed by the pressing roller 15(4) against each of the pair of bevel gears 10, and the sheet member S is clamped between the member contact position stabilizing magnet 15(3) and the pressing roller 15(6), and thus the sheet member S is held so as not to move arbitrarily (See FIG. 5). As a result, when the sheet member S is lifted up by magnetic force on each side of the bevel gears 10 and is bitten between the meshing teeth 10b, the sheet member S can be brought into contact with the bevel gears 10 at a constant angle.

Figure 3:
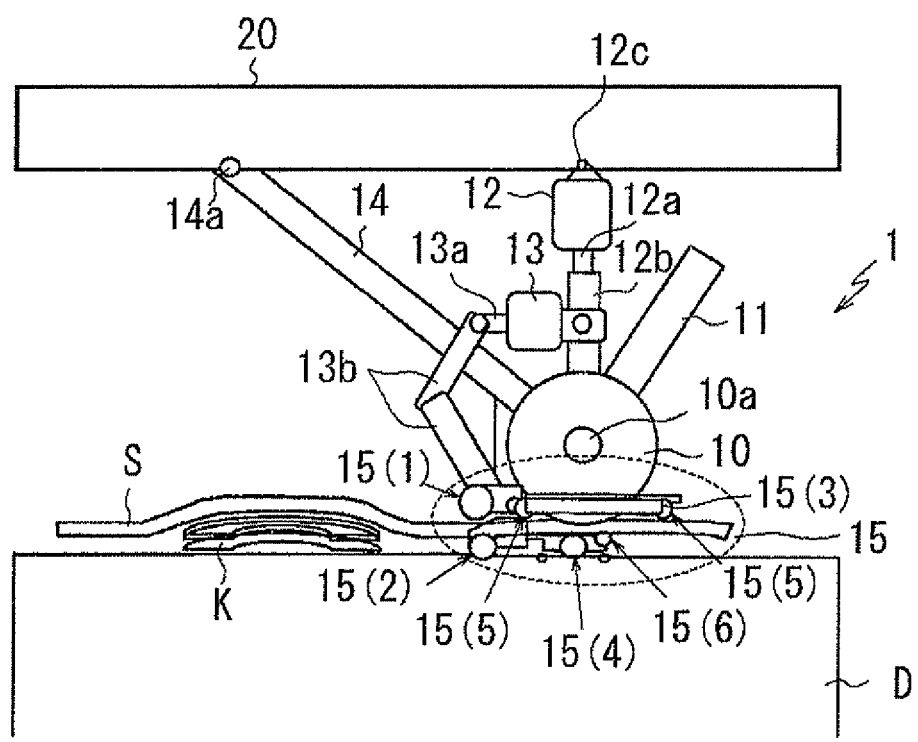
FIG. 3 is a front view illustrating a state in which the automatic zipper device in FIG. 1 is mounted on a lateral movement device. However, a portion of the sheet member is illustrated in section.

FIG. 3 is a front view illustrating a state in which this automatic zipper device 1 is mounted on a lateral movement device (however, a portion of the sheet member S is illustrated in section).

The lateral movement device 20 is configured such that a nut engaging with a lead screw rotated and driven by an appropriate driving mechanism for example a motor (not shown) in the present embodiment, is integrally mounted and the lateral movement device 20 moves linearly from side to side in the figure along a rotating shaft of a molding drum D in accordance with reversible rotation of the motor. As driving means for the lateral movement device 20, a rack and a pinion can be used, to move the lateral movement device 20 integrally mounted on the rack by rotation of the pinion by, for example, a motor. Alternatively, other known driving means can be also used.

An upper end of the inclined portion following cylinder 12 of the automatic zipper device 1 is fixed to the lateral movement device 20 by a pin or a bolt 12*c*. A support arm 14 is an arm connecting the lateral movement device 20 and the automatic zipper device 1, and its upper end portion is swingably connected to the lateral movement device 20 by a pin or a bolt 14*a*, while the other end is connected to the automatic zipper device 1 by any connecting means so that the other end can swing in accordance with vertical displacement of the automatic zipper device 1.

Subsequently, an operation of this automatic zipper device 1 described above will be explained.

In order to join both end portions of the sheet member S stuck to the molding drum D, after the sheet member S is stuck to the molding drum D, butting is performed so that a joining (joint) surface of the sheet member S may be set horizontal in a joining (zipping) direction by making use of light projected at zero angle for example. At that time, butted end portion of the sheet member S is bent upward, to thereby be put into a state of floating from a surface of the molding drum D. As a result, the lower induction magnet roller 15(2) can easily enter the lower side of the sheet member S through the gap.

Subsequently, by pressing a joint button (not shown) of the automatic zipper device 1, the molding drum D is rotated by a rotation driving mechanism, not shown, and the drum is stopped when the butting (joint) end portion of the sheet member S reaches a point immediately below the automatic zipper device 1.

In that state, the automatic zipper device 1 is lowered, and joining is started.

Here, each of the induction magnet rollers 15(1) and 15(2) is configured such that an electromagnet is provided on a roller portion, and the pair of induction magnet rollers 15(1) and 15(2) of the automatic zipper device attracts, by its magnetic force, the floating end portions of the sheet member S having a plurality of aligned reinforcing cords made of magnet attractive metal, to thereby take the end portions into the automatic zipper device 1. The induction magnet rollers 15(1) and 15(2) suppress arbitrary movement of the sheet member S by their magnetic forces after taking in the sheet member S, and thus, a space between the sheet members S can be prevented from being opened before joining.

Subsequently, by operating the driving mechanism of the lateral movement device 20 in that state, the automatic zipper device 1 is laterally moved from the right side to the left side in the figure.

Here, by extending the piston rod 13*a*, the dogleg-shaped arm 13*b* is pivoted around the shaft 13*c* to raise the pressing roller 15(4) and the pressing roller 15(6) together with the support frame body 16 mounted integrally on the lower end of this dogleg-shaped arm 13*b*. Then the sheet member S attracted by the member contact position stabilizing magnet 15(3) is pressed against the pair of bevel gears 10 by the pressing roller 15(4), and the sheet member is also pressed against and held by the member contact position stabilizing magnet 15(3) by the pressing roller 15(6). The sheet member S is held so as not to move arbitrary while the sheet member is bitten by the bevel gears 10 and is joined.

FIG. 3 illustrates a state in which the automatic zipper device 1 is laterally moving along the molding drum D from one side portion of the sheet member S as described above. In this state, the sheet member S is taken in by the pair of induction magnet rollers 15(1) and 15(2) by magnetic force acting on the magnet attractive metallic cords thereof and is held in position so that joint end portions do not separate from each other as described above. The taken-in sheet member S is attracted upward at the part located on each side of the bevel gears 10 by the member contact position stabilizing magnet 15(3), and the joint end is always maintained in contact with the bevel gear 10 at a constant angle. That is, the sheet member S is clamped by the pair of front and rear guide rollers 15(5) on the upper side and the pressing rollers 15(4) and 15(6) pulled up by the piston rod 13*a* and the dogleg-shaped arm 13*b*, and is held at a constant position, and is relatively moved with respect to the automatic zipper device 1 in a state of being pressed against the pair of bevel gears 10.

The sheet member S is joined (zipped) by having the joint end portions bitten by the pair of bevel gears 10 rotated and driven by the air motor 11 during the relative movement thereof. After that, the joined sheet member (endless sheet member) S goes out of the automatic zipper device 1.

Incidentally, during lateral movement of the automatic zipper device 1, if there is a tire-constituting member K already stuck to the molding drum D, the sheet member S is inclined upward in the vicinity thereof. When the automatic zipper device 1 reaches the inclined portion, the piston rod 12*a* of the inclined portion following cylinder 12 connected to the bevel gear 10 is retracted into the inclined portion following cylinder 12, as compressing air in the cylinder 12 by reaction force from this inclined surface. As a result, the automatic zipper device 1 including the bevel gear 10, and therefore also the guide portion 15 of the sheet member, joins the sheet member S while varying its vertical position along the inclined surface of the sheet member S. Note that the inclined portion following cylinder 12 can be adopted not only to the above described inclined portion but also to deflection of the sheet member S.

Figure 4:
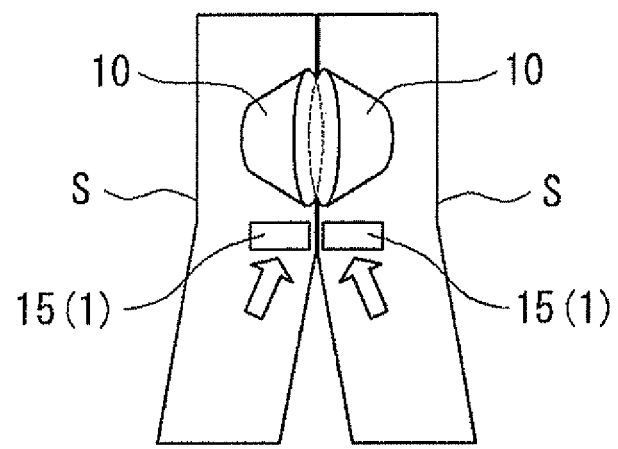
FIG. 4 is a plan view illustrating an essential part of the automatic zipper device illustrated for explaining taking-in of the sheet member by induction magnet rollers.

FIG. 4 is a plan view illustrating an essential part of the automatic zipper device illustrated for explaining taking-in of the sheet member S by the induction magnet rollers 15(1) and 15(2).

As previously described, the sheet member S is attracted by magnetic force of the pair of upper and lower induction magnet rollers 15(1) and 15(2) arranged in a direction orthogonal to the traveling direction of the automatic zipper device 1, and is taken into the automatic zipper device 1. In addition, as described above, the taken-in sheet member S is held in position by magnetic force of the pair of upper and lower induction magnet rollers 15(1) and 15(2) and the pressing force of the pressing rollers 15(4) and 15(6) from below, and thus does not move arbitrarily.

According to the present embodiment, each of the pair of upper and lower induction magnet rollers 15(1) and 15(2) is provided, and the sheet member S is held in position by its magnetic force, and thus when the automatic zipper device 1 moves along the joint portion of the sheet member S, the joint end portions of the sheet member S do not open (separate) before joining.

In addition, the sheet member S taken into the automatic zipper device is attracted by the member contact position stabilizing magnet 15(3), and is relatively moved by being guided by the pair of front and rear guide rollers 15(5) on the upper part side and the bevel gear of a small diameter or the pressing roller 15(4), the pressing roller 15(6), as being pressed against the bevel gear 10 by the pressing roller 15(4) on the lower part side and against the member contact position stabilizing magnet 15(3) by the pressing roller 15(6), and the joint edges are reliably joined each other by being bitten by the pair of bevel gears 10 as always maintaining in contact with the bevel gear 10 at a constant angle.

Figure 5:
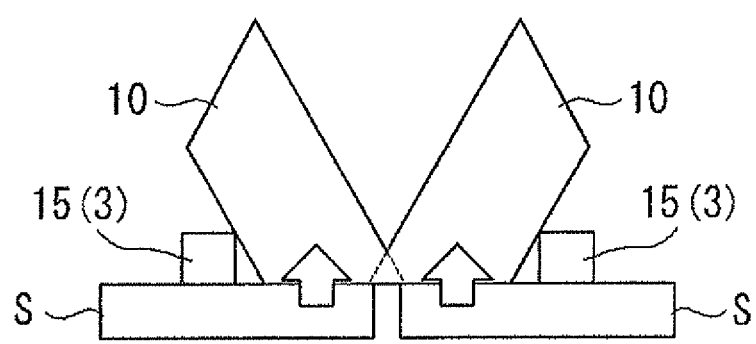
FIG. 5 is an A-A cross-sectional view of the automatic zipper device in FIG. 1.

FIG. 5 is an A-A cross-sectional view schematically illustrating the automatic zipper device in FIG. 1.

As illustrated, before joining by the bevel gear 10, the sheet member S is attracted upward at the part located on each side of the bevel gears 10 by the member contact position stabilizing magnet 15(3), and is held in a pressed and clamped position by the member contact position stabilizing magnet 15(3) and the pressing roller 15(6), and is also pressed against the bevel gear 10 by the pressing roller 15(4), and thus the joint position does not shift to the right or left from the center line. As a result, there is no need to manually hold down an remaining portion after joining as in the case where a hand zipper device is used, the joint end portions of the sheet member S are always in contact with the bevel gears 10 at a constant angle, and the end portions are bitten between the bevel gears 10 and joined as previously described, and thus the sheet member is joined uniformly all the time.

The present embodiment has been described as above, and according to the present embodiment, advantageous effects of at least the following (1) to (6) can be obtained:

(1) By performing a work by the lateral movement device, variation in a joining quality caused by human work is eliminated;

(2) By automating the work by the lateral movement device, a work with a heavy article (hand zipper device) is eliminated, and a labor of a handling person can be alleviated;

(3) Since an automatic following function of the inclined portion is provided by the inclined portion following cylinder, a portion relying on the skill can be automated and therefore adjustment of a worker can be eliminated;

(4) Since the induction magnet roller is mounted, the rubber sheet member can be introduced smoothly and easily into the device;

(5) Since the induction magnet roller is mounted, a space between the rubber sheet members, before joining, can be prevented from being opened; and (6) Since the member contact position stabilizing magnet is mounted, the rubber sheet member and the bevel gear can be brought into contact with each other at a constant angle all the time.

REFERENCE SIGNS LIST 1 automatic zipper device
10 bevel gear
10a center shaft
10b teeth
11 air motor
12 inclined portion following cylinder
13 clamping cylinder
13a piston rod
13b dogleg-shaped arm
13c shaft
14 support arm
15 guide portion of sheet member
15(1), 15(2) induction magnet roller
15(3) member contact position stabilizing magnet
15(4), 15(6) pressing roller
15(5) guide roller
20 lateral movement device
D molding drum
K tire-constituting member
S sheet member

The invention claimed is:

1. An assembly of an automatic zipper device and a support arm for joining two joint end portions of a sheet member while moving the joint end portions after the sheet member has been wound around a molding drum periphery, the assembly comprising:
   a roller assembly configured to take in the sheet member into the device;
   a pair of bevel gears that are configured to bite between teeth meshing with each other while being rotated and driven and join the joint end portions of the sheet member taken into the device;
   a clamping cylinder positioned forward of the axles of the pair of bevel gears in a traveling direction of the bevel gears and having a piston rod rotatably connected to an upper end of a dogleg-shaped arm that is pivotally connected to a support frame body supporting a press at a lower end of the support frame, and configured to clamp the sheet member passing through the bevel gears at a predetermined position,
   the support arm having an upper end swingably connected to a lateral movement device forward of the automatic zipper device in a traveling direction of the automatic zipper device and a lower end swingably connected to the automatic zipper device, and
   wherein the sheet member includes a rubber member, the sheet member having magnet-attractive metallic cords embedded therein, and
   wherein the clamping cylinder, as the piston rod of the clamping cylinder is extended, lifts the support frame body together with the press to press the sheet member against the bevel gears and a position stabilizing magnet on each of opposite sides of the pair of bevel gears and coextensive with the bevel gears along a direction parallel to the traveling direction of the bevel gears, and maintain the sheet member at the predetermined position.

2. The assembly according to claim 1, wherein
the roller assembly is provided with a magnet, and the roller assembly comprises an upper roller and a lower roller arranged forward of the bevel gears in the traveling direction of the automatic zipper device and orthogonal to the traveling direction of the automatic zipper device.

3. The assembly according to claim 1, further comprising:
a position adjuster configured to adjust an upper position and a lower position of the bevel gears in accordance with an inclination of the sheet member.

4. The assembly according to claim 3, wherein
the position adjuster is an air cylinder.

* * * * *